United States Patent
Moreau et al.

(10) Patent No.: US 10,926,590 B2
(45) Date of Patent: Feb. 23, 2021

(54) SELF-TRACKING METHOD FOR SENSORS EQUIPPING THE WHEELS OF A VEHICLE

(71) Applicant: LDL TECHNOLOGY SAS, Ramonville Saint Agne (FR)

(72) Inventors: Thierry Moreau, Balma (FR); Benjamin Martinez, Pau (FR)

(73) Assignee: LDL TECHNOLOGY SAS, Ramonville Saint Ange (FR)

( * ) Notice: Subject to any disclaimer, the term of this patent is extended or adjusted under 35 U.S.C. 154(b) by 55 days.

(21) Appl. No.: 16/155,957

(22) Filed: Oct. 10, 2018

(65) Prior Publication Data
US 2019/0111741 A1    Apr. 18, 2019

(30) Foreign Application Priority Data

Oct. 13, 2017  (FR) ....................................... 1759638

(51) Int. Cl.
*B60C 23/00* (2006.01)
*B60C 23/04* (2006.01)
*G01P 15/00* (2006.01)

(52) U.S. Cl.
CPC ........ *B60C 23/0416* (2013.01); *B60C 23/045* (2013.01); *B60C 23/0433* (2013.01); *B60C 23/0488* (2013.01); *B60C 23/0489* (2013.01); *G01P 15/00* (2013.01)

(58) Field of Classification Search
CPC ...................................................... G01P 15/00
USPC ....................................................... 73/146.2
See application file for complete search history.

(56) References Cited

U.S. PATENT DOCUMENTS

| | | | |
|---|---|---|---|
| 6,209,913 B1 * | 4/2001 | Ishikawa | B66F 17/003 280/755 |
| 6,719,098 B1 * | 4/2004 | Ishikawa | B60G 17/005 187/222 |
| 8,149,100 B2 | 4/2012 | Gila et al. | |
| 9,849,736 B2 * | 12/2017 | Watanabe | B60C 23/0455 |
| 2007/0144639 A1 * | 6/2007 | Oh | B60C 23/0401 152/152.1 |

(Continued)

FOREIGN PATENT DOCUMENTS

| | | |
|---|---|---|
| EP | 2537689 A1 | 12/2012 |
| FR | 2863204 A1 | 6/2005 |

OTHER PUBLICATIONS

Mitchell, TPMS: 2006-2022, Mercedes-Benz M Class, Modern Tire Dealer (4 pages).

*Primary Examiner* — Jamel E Williams
(74) *Attorney, Agent, or Firm* — Paul & Paul (57) ABSTRACT

The invention relates to a method for self-tracking of a data acquisition sensor equipping a wheel including a tire on a vehicle comprising a plurality of wheels (200) and being equipped with a system comprising an electronic unit (300) for a data acquisition sensor placed in each tire equipped with a radio-frequency transmitter for the purpose of the wireless transmission of said data to a central transmission and reception module (100) placed on the axle or frame of the vehicle, with the central transmission and reception module (100) receiving and decoding the information signals issued by the transmitters of each wheel, each electronic unit (300) being equipped to measure acceleration. The method is remarkable in that it consists of determining the front and rear of a tire by measuring the acceleration.

12 Claims, 9 Drawing Sheets

(56) References Cited

U.S. PATENT DOCUMENTS

| | | | |
|---|---|---|---|
| 2010/0274441 A1* | 10/2010 | Carresjo | B60C 23/0416 |
| | | | 701/31.4 |
| 2012/0136530 A1* | 5/2012 | Kanenari | B60C 23/007 |
| | | | 701/33.4 |
| 2013/0074591 A1* | 3/2013 | Hyun | B60C 23/0416 |
| | | | 73/146.3 |
| 2015/0165835 A1* | 6/2015 | Peine | B60C 23/0416 |
| | | | 340/447 |
| 2016/0288595 A1* | 10/2016 | Watanabe | B60C 23/0455 |
| 2017/0001485 A1 | 1/2017 | Kessler et al. | |
| 2017/0050478 A1* | 2/2017 | Ijima | B60C 23/04 |
| 2017/0203619 A1* | 7/2017 | Gow | B60C 23/0416 |
| 2018/0022171 A1* | 1/2018 | Okada | B60C 23/0416 |
| | | | 701/33.4 |
| 2019/0230615 A1* | 7/2019 | Werner | B60C 23/0488 |
| 2019/0349875 A1* | 11/2019 | Wu | B60C 23/0455 |

\* cited by examiner

SELF-TRACKING METHOD FOR SENSORS EQUIPPING THE WHEELS OF A VEHICLE

FIELD OF APPLICATION OF THE INVENTION

This invention relates to the field of sensors housed in the wheels of a vehicle and, specifically, to adaptations making it possible to provide them with self-tracking and to operate them under the best conditions.

DESCRIPTION OF THE PRIOR ART

In the prior art, sensors are known that are positioned inside vehicle tires in order to measure and transmit data relating to pressure, temperature, etc. . . . . . In order to do this, each sensor placed in each tire is classically equipped with a radio-frequency transmitter for the purpose of wireless transmission of said data to a receiver module placed on the axle or on the frame of the vehicle. This receiver module receives and decodes the information signals transmitted by the transmitters on each wheel.

In certain vehicles such as heavy goods vehicles, as well as buses, the wheels are mounted in pairs at each end of the axle, which are called twinned wheels. Whether the wheels are twinned or not, it is difficult to differentiate the transmissions of the sensors as well when halted as during operation of the vehicle, without implementing especially complex and burdensome coding and identification techniques.

So that the receiver may self-track the wheels, it must know the location of the sensor (position on the left or right of the vehicle) as well as its position relative to the receiver module (front, rear, close, far).

A differentiation solution is described in document EP1172656 which proposes a sensor to detect the rotation direction of a body. The sensor comprises a first available accelerometer, used, on the body, and having a first detection direction, and a second available accelerometer, used, on the body and having a second detection direction. Both accelerometers are arranged such that the first and second detection directions are not parallel to each other and are not parallel to the axis of rotation of the body, such that there is a difference of phase due to gravitational effects between the outputs of the accelerometers when the body turns while in use. The means receive the output signals indicating acceleration of the first and second accelerometers and determining the phase relationship between the two signals in order to thus determine the rotation direction of the body. Knowledge of the acceleration, of the forward direction of the vehicle and, finally, of the rotation direction of the wheels makes it possible to differentiate the signals coming from the wheel sensors located to the left of wheels located at the right.

Nonetheless, it seems that these methods and devices are implemented for a left/right differentiation but cannot be so implemented for a front/rear differentiation. In fact, the position relative to the receiver module cannot be determined using the magnetic radiation of the sensor due to the fact that several wheels on the same side may be at an equal distance from the receiver as a function of their placement, making self-tracking impossible.

Another problem linked to the operation of these systems resides in the management of the batteries. In fact, even though, in fine, self-tracking of all sensors may be achieved, it still remains that in the plurality of situations, the transmission or reception that they must execute, is not certain under good conditions, which causes the sensor associated with the wheel and the receiver associated with the frame to consume energy inefficiently. The batteries powering each sensor then have limited life.

DESCRIPTION OF THE INVENTION

Beginning with this situation, the applicant has conducted research for the purpose of proposing a better self-tracking of the electronic units of the sensors lodged in the wheels of a vehicle.

This research led to the design and embodiment of a new, simple method for implementation and elimination of the problems of the prior art.

This self-tracking method for a data acquisition sensor equipping a wheel including a vehicle tire, said vehicle comprising a plurality of wheels and being equipped with a system comprising an electronic unit for a data acquisition sensor, placed in each tire and equipped with a radio frequency transmitter for the purpose of wireless transmission of said data to a central transmission and reception module placed on the axle or on the frame of the vehicle, the central transmission and reception module receiving and decoding the information signals transmitted by the transmitters on each wheel, each electronic unit being equipped to measure acceleration, is remarkable in that it consists of determining the front and rear of a tire by measuring the acceleration.

The measurement of the measured acceleration of a sensor turning at the same time as a wheel (since fixed to the latter) makes it possible to determine at which moment the sensor is located at the high point of its circular trajectory, and at which moment it is located at its low point. In fact, the normal acceleration of the Earth's field of gravity is one of the measured acceleration components, as a result:

the measured acceleration is at its maximum at the low point of the circular trajectory due to the fact that the acceleration to which the sensor is subjected is oriented in the same direction as the normal acceleration of the Earth's field of gravity, the measured acceleration is minimum at the point located at the high place on the circular trajectory due to the fact that the acceleration to which the sensor is subjected is oriented opposite to the normal acceleration of the Earth's field of gravity.

Such a method may be applied to monitoring systems for the tires of a vehicle which has this communication configuration with the temperature and/or pressure sensors.

We understand that in learning the forward direction of the vehicle, the determination of these maximum and minimum acceleration points corresponding respectively with the low and high points of the circular trajectory of the wheel, makes it possible to establish that, when the vehicle is moving forward:

the front of the wheel and therefore of the tire which is located between the minimum acceleration point and the maximum acceleration point, the rear of the wheel and therefore of the tire which is located between the maximum acceleration point and the minimum acceleration point.

With the understanding, the maximum and minimum measurements of acceleration depend on the position of the sensor, the results above may be reversed, specifically when the vehicle is moving forward:

the rear of the wheel and therefore of the tire which is located between the minimum acceleration point and the maximum acceleration point, the front of the wheel and therefore of the tire which is located between the maximum acceleration point and the minimum acceleration point.

This characteristic is particularly advantageous in that it makes it possible to establish with certainty at least one parameter participating in localization which will make several strategies possible related to front and rear localization, but also management of energy consumption.

This characteristic makes it possible to again exploit an available parameter, namely, the measurement of acceleration measured by the sensor in the vertical plane (in relation to a horizontal floor) that it occupies.

According to another particularly advantageous characteristic of the invention, where said electronic units comprise:

a receiving unit receiving radio signals from the central transmission and reception module, the receiving unit being capable of measuring the power of the radio signals from the central transmission and reception module, the method is remarkable in that it comprises, for each electronic unit, the following operations:

measurement of the power of the radio signals issued by the central transmission and reception module and received by the electronic unit, distribution of the received radio signals into the two following signal groups first group corresponding to the signals received chronologically between the high point and the low point, second group corresponding to the signals received chronologically between the low point and the high point, such that if a majority of received signals is measured at high power between the high point and the low point, the wheel containing the unit completing this measurement is arranged at the rear of the central module, if a majority of signals received is measured at low power between the high point and the low point, the wheel containing the unit completing this measurement is arranged at the front of the central module.

Thus, after having determined where the electronic unit is located in relation to the front or rear of the wheel, the method proposes to determine the front or rear position of the electronic unit in relation to the central transmission and reception module.

Associated with a left/right localization as the prior art was able to propose, the method makes possible an exhaustive and efficient self-tracking of the electronic units of the monitoring system.

The value of this measurement of power may be analog, that is to say, a numeric representation of power. According to another method, the value of this measurement may be logical, that is to say, a binary representation in relation to a defined threshold. The reception rate of this logical value makes it possible to obtain an image of the power (example, in the case of LF radio waves: N of LF thresholds crossed in a 4 ms window of a fixed, known number of transmissions in 4 ms (P): rate=N/P).

According to another particularly beneficial characteristic of the invention, the method comprises the operation of fixing the central transmission and reception module at the level of an axis of the axle such that a situation occurs where no majority appears in the signals measured confirming that the wheel containing the unit completing this measurement is placed at the height of the central transmission and reception module.

In order to implement this method, the electronic units are going to be able to be integrated into the grid of the signals sent to the central module for information linked to the power of the signals, whether they are received or not, at the front or at the back, with different powers or not.

According to another particularly beneficial characteristic of the invention, the radio signals used are in the low frequency spectrum (LF), that is, the portion of the radio electric frequency spectrum comprised between 30 kHz and 300 kHz. The use of this range of frequency makes it possible to be more precise and to consume less energy.

According to another particularly beneficial characteristic of the invention, the method comprises the operation of variation of the power of the low frequency signals (LF). This variation starts or cuts off communication between the central module and the electronic units according to the power of the signal which makes it possible to locate the electronic units and the wheels that bear them.

Determination of the location of the electronic unit in relation to the front or rear of the wheel at an instant "t" makes it possible to forecast a plurality of other applications specifically which may be, for example to provide benefits in the management of batteries.

In fact, according to another particularly beneficial characteristic of the invention, the method consists of causing the transmission unit to transmit from the electronic unit when the latter is well oriented in relation to the central transmission and reception unit.

According to another characteristic, the method consists of causing the central transmission and reception module to transmit to the electronic unit reception device when the latter is well oriented in relation to the central transmission and reception module.

According to another particularly beneficial characteristic of the invention, the method consists of avoiding causing the transmission units of the electronic units to simultaneously transmit to the electronic units fixed to twinned wheels when they are located in the same zone.

We understand that this selection of the right moment for authorized transmission and reception by knowing the front or rear situation of the electronic units will lead to a better management of the batteries. The quality of the transmissions is also improved since collisions are avoided.

The implementation of this method requires functional modules already used in this type of system.

Thus, for example, according to a minimal material configuration allowing the implementation of the method of the invention, the electronic unit fixed to the wheel comprises:

pressure and/or temperature sensors,
an energy source such as a battery,
micro-controller,
RF transmitter,
RF antenna,
LF receiver,
LF antenna,
radially oriented accelerometer (Z),
tangentially oriented accelerometer (X).

In order to avoid the excessive consumption of energy of batteries during use of the differentiation of the front and rear positions of the tires for the purposes of optimized transmission or reception, the method of the invention is remarkable in that it comprises a sensor of high or low tilt to determined, in which angular section the unit is located.

This tilt sensor may be positioned in the unit, the wheel or on the axle.

The speed of the vehicle can be known by means for example, of a GPS module in the central transmission and reception module of the vehicle.

A known example of tilt sensor, contains a metal ball in its interior, and behaves like a normally closed switch. If it is tilted to an angle greater than a threshold, the circuit is opened. Such a sensor may be used to sense (at a lower cost than the accelerometer and requiring less energy) the movements of or changes in the inclination of the wheel and of the unit positioned on the wheel.

The functioning of the system can then be that described below.

At the first rotations of the wheels, when the benchmarking strategy for the front and rear of the wheel is initiated, it is possible to allocate an RF performance level of the monitoring system received as a function of the angular degree of its position during rotation of the wheel.

Then, the receptor can define, for each electronic unit, what are the angular sections that are favorable to the transmission of TPMS, with the goal being to avoid transmitting into poor performance zones for transmission or reception, in order to preserve the battery.

If we continue to use the first strategy, that is, to use the accelerometer included in the electronic unit, consumption is too great, up to 0.7 µA·h per rotation of the wheel. It is for this reason that, once the mapping is completed through the first phases of the method, we then use a low-energy-consumption tilt sensor. This "tilt" sensor is either additional in the minimum TPMS device or, in the case of a unit associated with the tire wall, the tilt is given naturally by the sensor impact with the ground.

Thus, by means of existing, or very slightly modified, equipment, the device of the invention makes it possible to effect this transmission savings which may double the life span of the sensor in the most favorable cases. The tilt is used to allow the sensor to benchmark itself in space, between two tilts, it is located at 180° of the tilt, and linearly, we cut the wheel sections using the inter-tilt duration of the preceding rotation, (thus, we can cut up to sections) which makes it possible to have the best position for transmitting or receiving.

According to another particularly beneficial characteristic, the method is remarkable in that each electronic unit comprises a visual benchmark on its upper surface in order to comply with an orientation during its installation on the wheel. In order to do this, said electronic units comprise an arrow on their upper surface indicating the flange of the wheel toward which the arrow must be pointed during mounting of the unit in the wheel. Thus, all of the units are pointed in the same way and are then arranged in opposition in the twinned wheels from one wheel to the other. Knowing the direction of rotation detected for each wheel then makes it possible to differentiate the signals issued by the twinned wheels sensors and makes it possible to apply the invention despite the twinning of the wheels.

With the basic concepts of the invention having been explained above in their most elementary form, other details and characteristics will emerge more clearly upon reading the following description and in relation to the attached drawings, giving as an example, but not limited to, a means for the embodiment of a method and of a device according to the invention.

DESCRIPTION OF THE PREFERRED EMBODIMENTS

Figure 1:
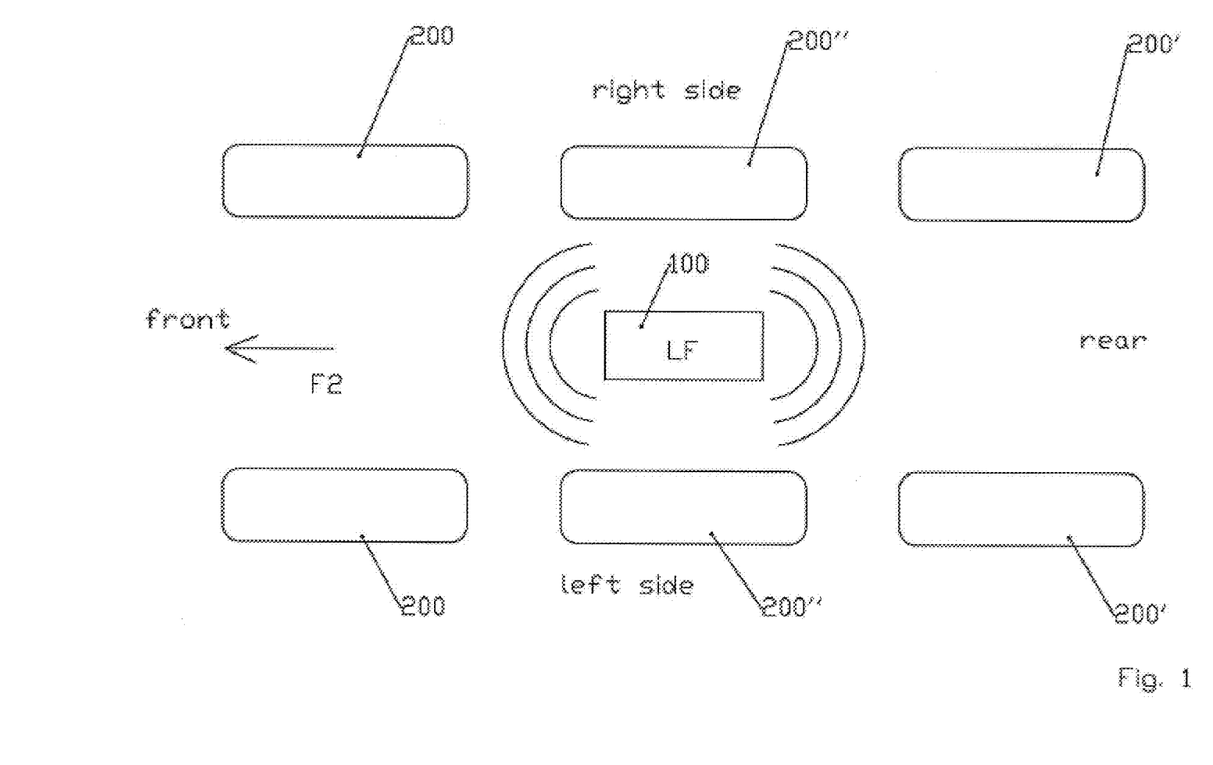
FIG. 1 is a schematic drawing of a top view of a six-wheel vehicle in a situation where the method of the invention can be applied.

As illustrated by the drawing in FIG. 1, a monitoring system for the pressure and/or temperature of tires equips a vehicle represented here in view from above by its six wheels. The system comprising an electronic unit (not illustrated), placed in each tire and equipped with a radio frequency transmitter for the purpose of wireless transmission of said data to a central module 100 transmission and reception module placed on the axle or on the frame of the vehicle. The central transmission and reception module 100 receives and decodes the information signals transmitted by the transmitters on each wheel. Each electronic unit (not illustrated) being equipped to measure acceleration.

Figure 2:
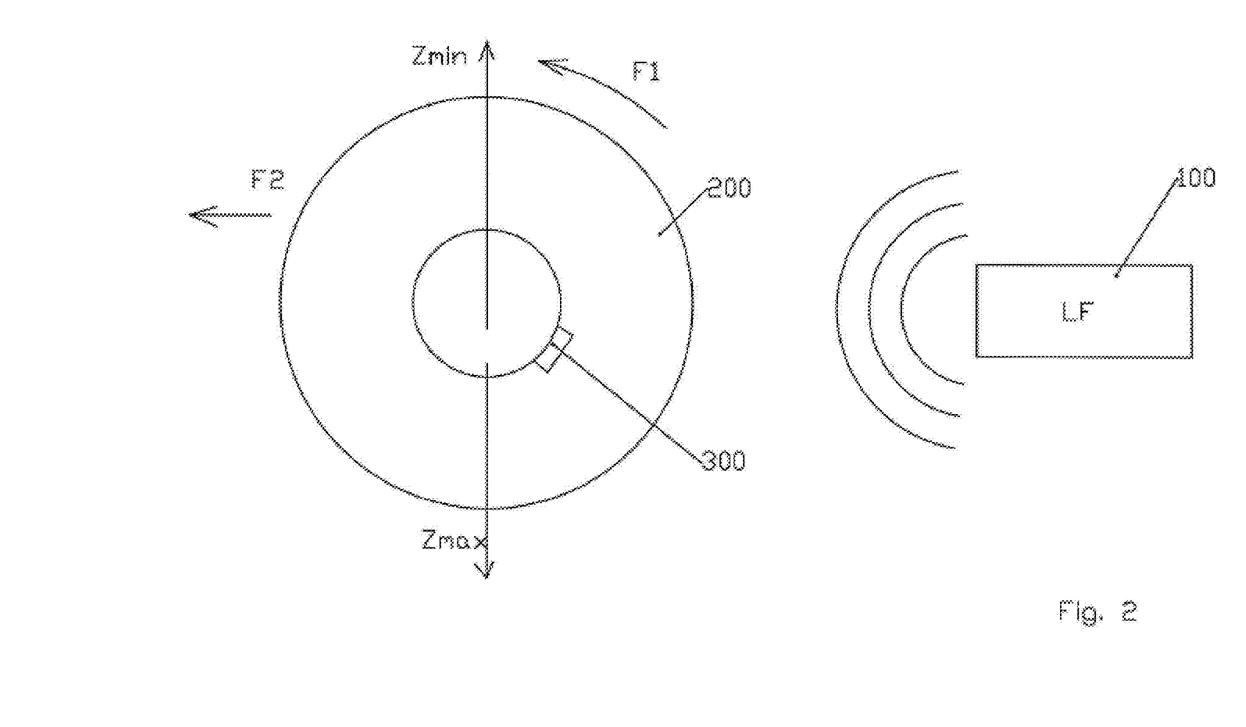
FIG. 2 is a schematic drawing of a side view of a wheel positioned in front of a central module.

FIG. 2 illustrates a wheel 200 placed in front of the central module 100. As explained above, the measurement of acceleration by the electronic unit 300 during rotation (arrow F1) of the wheel 200, namely, during movement of the vehicle, makes it possible to determine two points:

the high point of the wheel corresponding to an acceleration in Z minimal, designated Z min.

the low point of the wheel corresponding to an acceleration in Z maximal, designated Z max.

This determination of high and low points makes it possible to divide the wheel 200, into a forward part and a rear part. As illustrated, the central module 100 transmits in LF.

Each electronic unit 300 comprises:

a receiving unit (not illustrated) receiving radio signals from the central transmission and reception module, the reception unit being capable of measuring the power of the radio signals received from the central transmission and reception module 100.

Figure 9:
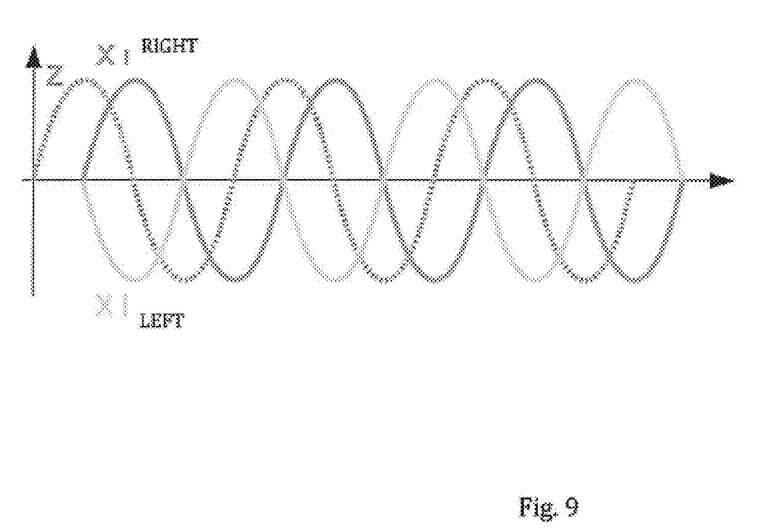
FIG. 9 is a schematic drawing of sinusoidal curves followed by the acceleration measurements.

According to the invention, each electronic unit 300 implements the following operations:

it measures the power of LF radio signals sent by the central transmission and reception module 100.

it distributes the received radio signals into the two following signal groups:

first group corresponding to the signals received chronologically between the high point (Z min) and the low point (Z max), second group corresponding to the signals received chronologically between the low point (Z max) and the high point (Z min). These high and low points are easily found by reading the curve in FIG. 9 where the high and low points of the curves respectively correspond to the minimum and maximum accelerations measured. We also understand that the operation of the "tilt" sensors would correspond to the direct detection of a single high or low point of accelerations without taking intermediate measurements.

By comparing said groups, and learning the direction of progress F2 of the vehicle, if a majority of received signals is measured at high power between the high point and the low point, the wheel containing the unit completing this measurement is arranged at the rear of the central module, like the wheels 200' in FIG. 1, if, as in the example illustrated in FIG. 2, a majority of signals received is measured at low power between the high point and the low point, the wheel 200 containing the unit 300 completing this measurement is arranged at the front of the central module 100.

We also understand that, if no majority of signals is established, the wheels in question are those designated 200" (cf. FIG. 1) located at the height of the central module 100. According to the invention, the central module 100 is positioned at the height of the wheel axis for this purpose.

The part of the wheel between the high point and the low point where signal powers are measured, is used here as a reference. With the understanding that another part could be used. It is also possible to use the high power as a reference and to determine which part of the wheel receives the most high-power signals.

Automatic determination of the front or rear position of the wheels in relation to the central module 100 is used in self-tracking of the wheels by associating it with a left/right localization like those known in the prior art.

Figure 3:
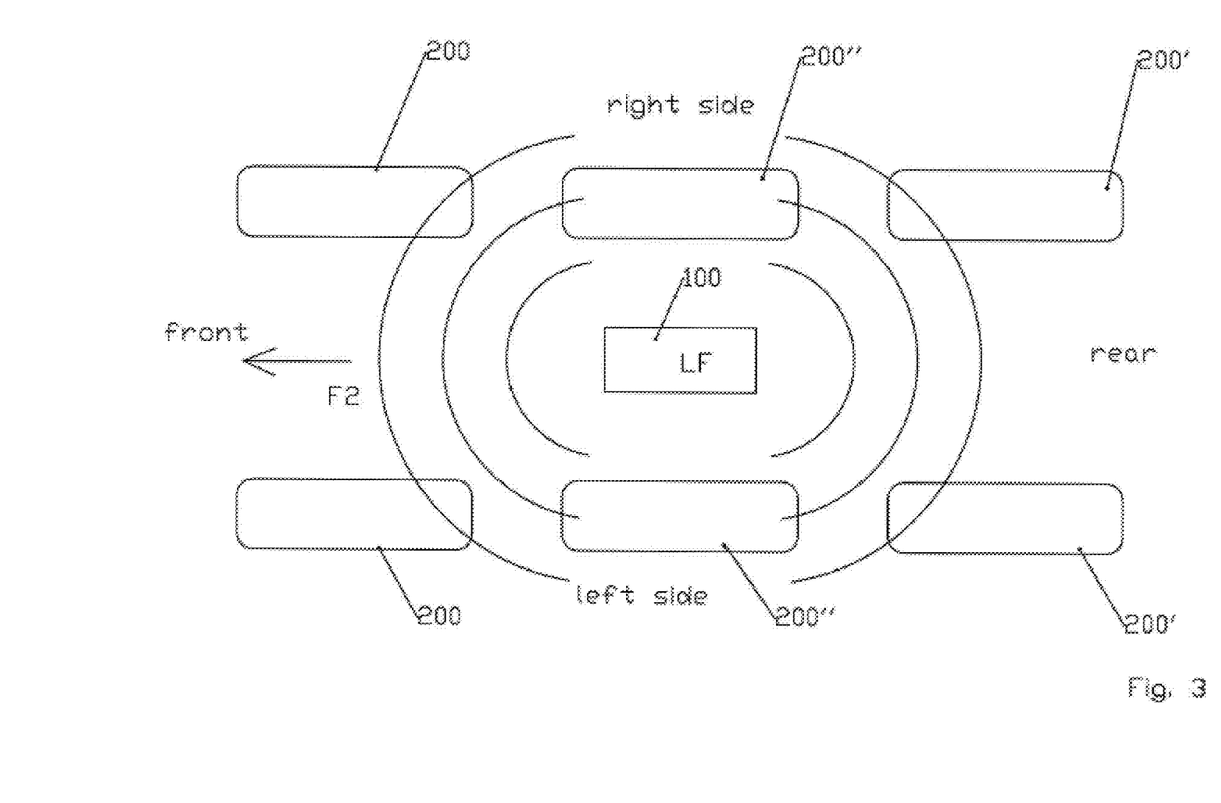
FIG. 3 uses the drawing from FIG. 1 with a greater signal power.
Figure 4:
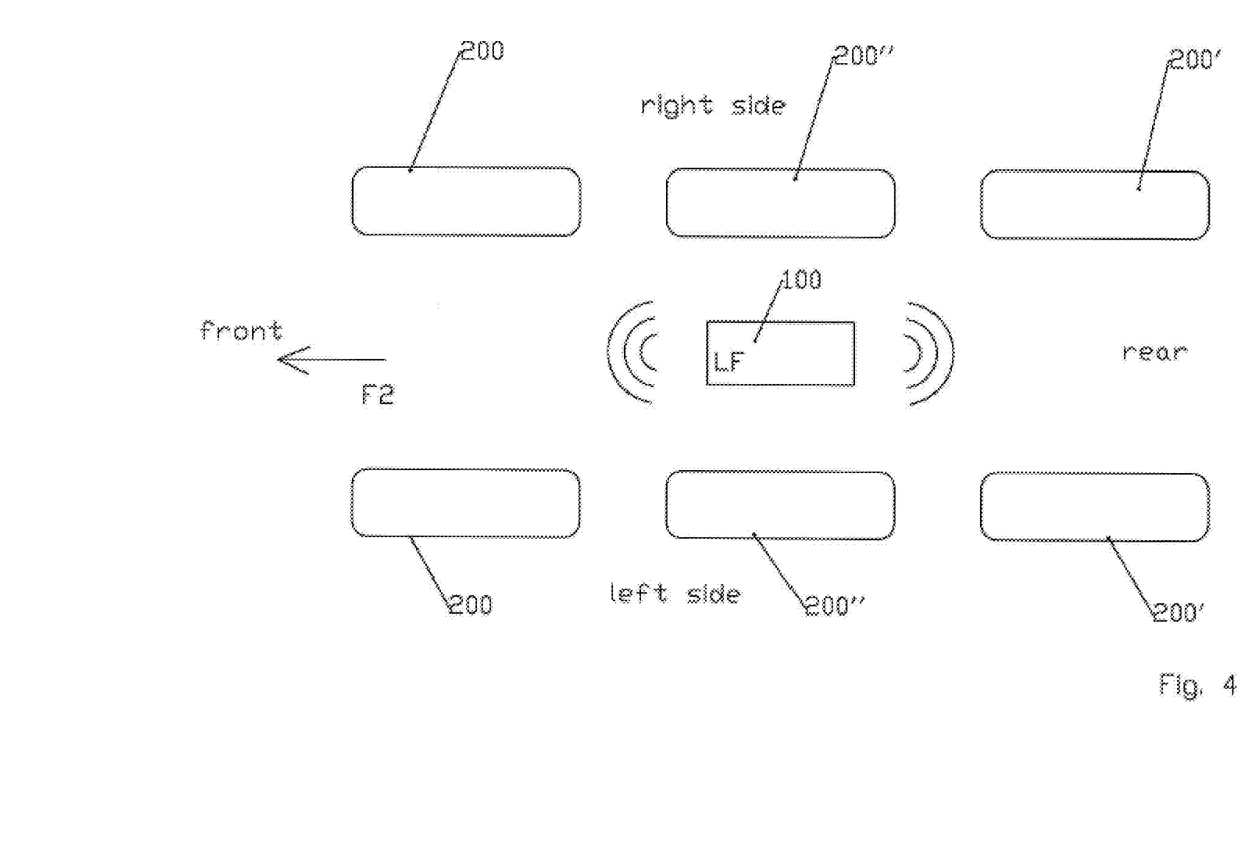
FIG. 4 uses the drawing from FIG. 1 with a lesser signal power.

Another operation making it possible to refine the front and rear and/or that of left/right localization consists of varying the power of the LF signal issued by the central module 100, as illustrated in the drawings of FIGS. 3 and 4.

The transmission power may also be modulated as a function of the size of the vehicle and of the distance between the wheels.

According to a preferred embodiment, the reception module is positioned centered on the frame as illustrated in the drawings of FIGS. 7a, 7b, 7c and 7d. Depending on whether the wheels are located on an upper or lower radius of two meters in relation to the reception module 100, configurations can vary.

Figure 7A:
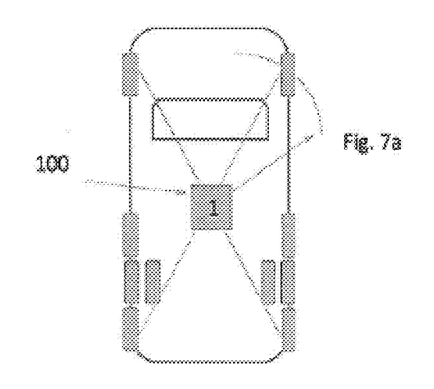
FIGS. 7a, 7b, 7c and 7d are schematic drawings from an upper view of four different vehicles illustrating the disposition of the reception modules according to the arrangement of the wheels.
Figure 7B:
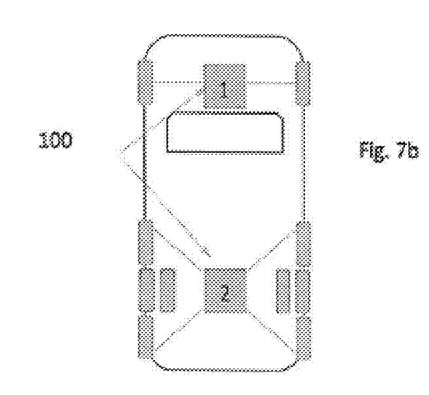
Figure 7C:
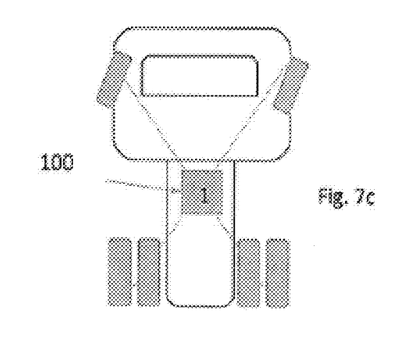
Figure 7D:
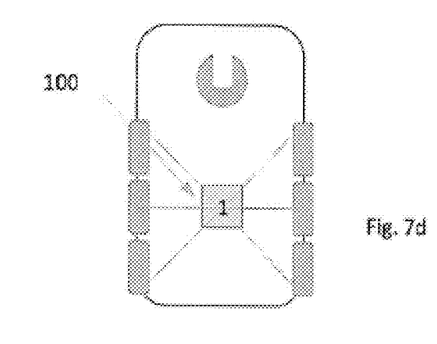

The drawings in FIGS. 7a, 7c and 7d illustrate the locations of wheels installed at least 2 meters from the reception module 100. The drawing in FIG. 7b illustrates a location of wheels exceeding the radius of two meters and thus requiring the presence of a second reception module 100.

Figure 5:
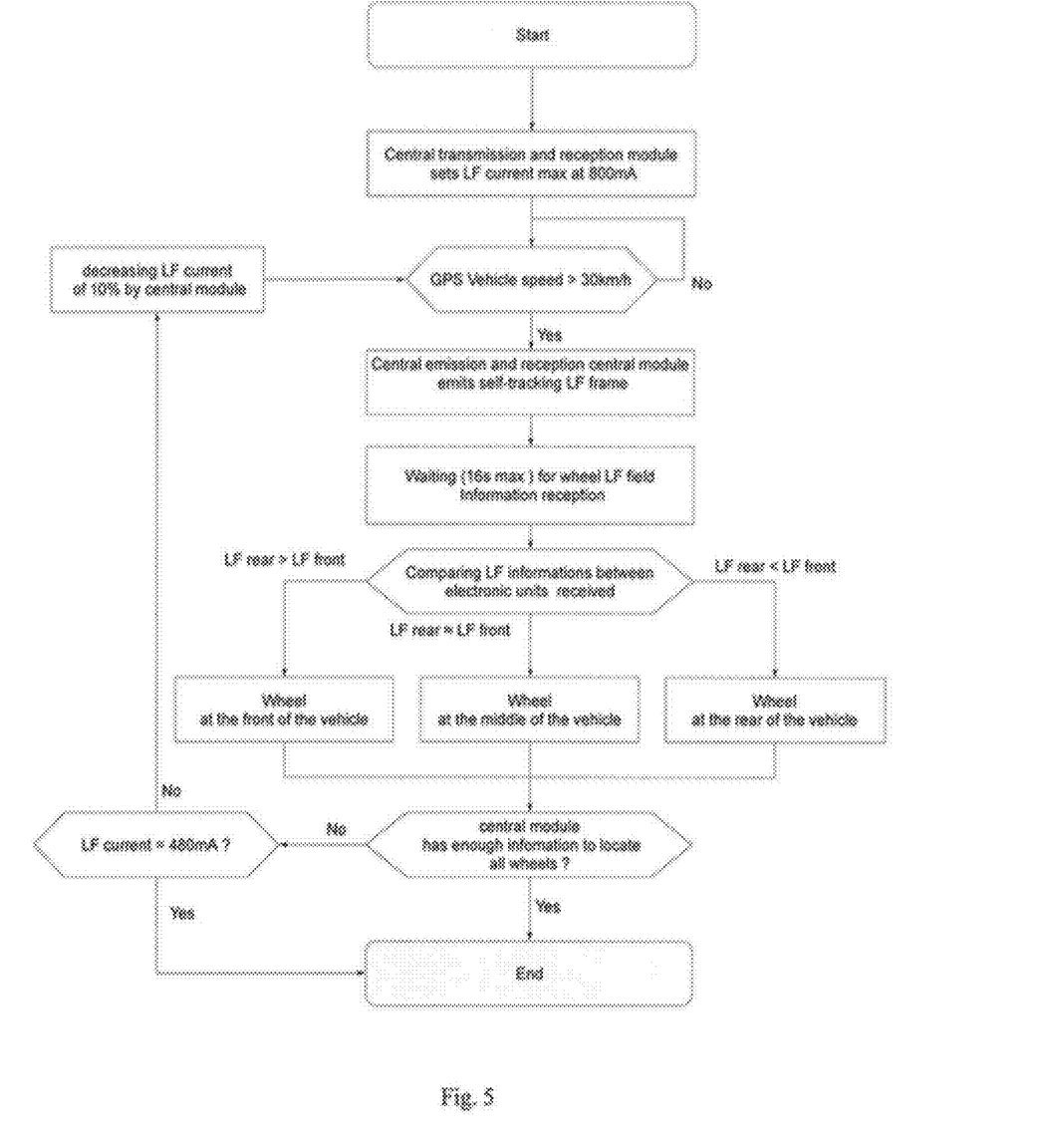
FIG. 5 is a flow chart illustrating a means for the embodiment of the method of the invention.

According to a preferred, but not limitative, means of embodiment, the method of self-tracking of the wheels of a vehicle such as a truck is done according to the following steps:

installation of electronic units on the wheels of the truck,
configuration (by using a portable electronic module or with a CAN connection) and installation on a central module on the truck according to a position chosen in relation to the positioning of the vehicle's wheels,
when the electronic unit measures a radial acceleration greater than 4 g, lateral localization is implemented (by means of a technical solution known in the prior art),
the central module receives data regarding the lateral position of the sensor of the electronic unit (information contained in the message transmitted in RF),
the central module probes with a full power LF signal in order to select only the sensors mounted on the vehicle,
the central module completes the front/rear localization by LF on the electronic units' sensors according to the flow chart illustrated by the drawing in FIG. 5,
the central module memorizes the localizations of the electronic units' sensors.

Figure 6:
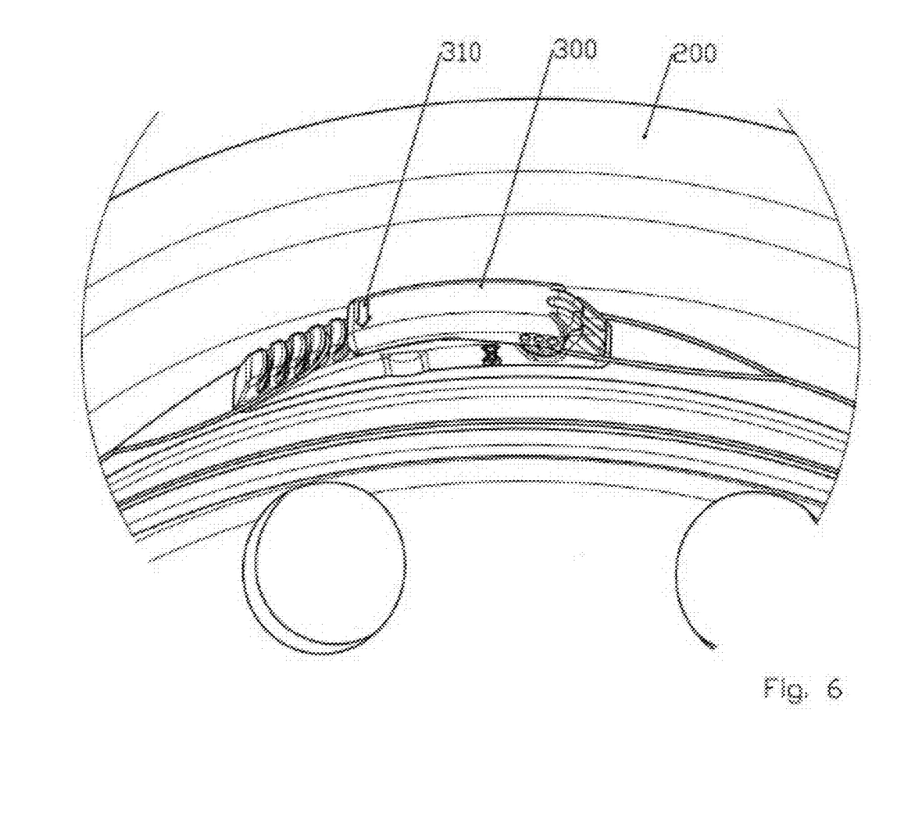
FIG. 6 is a schematic drawing of a perspective view of a means for the embodiment of an electronic unit according to the invention.

FIG. 6 illustrates a means of embodiment of an electronic unit making it possible to implement the method of the invention. As illustrated, said unit 300 comprises, on its upper face, an arrow 310 which must always be positioned to indicate the same side of the wheel, namely, the flange side.

Figure 8:
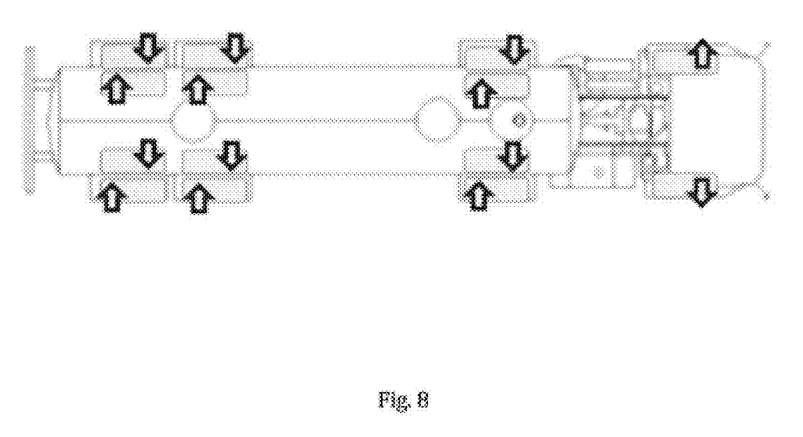
FIG. 8 is a schematic drawing from an upper view illustrating the positioning of the sensor units in a vehicle configuration for a vehicle with twinned wheels.

Thus, as illustrated in the drawing of FIG. 8, the sensors of the two wheels positioned at the same extremity of the axle are then disposed opposite each other. By systematically orienting the electronic units in the same way as the sensors in the wheels, they are found opposite each other when the wheels are twinned. By knowing the rotation direction of the wheels, it is then possible to differentiate the signals sent from the two twinned wheels.

It is understood that the method and the device, which have just been described and shown hereinabove, were described and shown for the purposes of divulgation, rather than as a limitation. Of course, various arrangements, modifications and improvements can be made to the example hereinabove, without however leaving the scope of the invention.

The invention claimed is:

1. Self-tracking method for a data acquisition sensor equipping a wheel including a vehicle tire mounted on a vehicle,
said vehicle comprising a plurality of wheels (200)
said vehicle being equipped with a system comprising an electronic unit (300) for a data acquisition sensor, placed in each tire and equipped with a radio frequency transmitter, the radio frequency transmitter wirelessly transmitting data to a central transmission and reception module (100) placed on the axle or on the frame of the vehicle,
the central transmission and reception module (100) receiving and decoding the information signals transmitted by the transmitters on each wheel, each electronic unit (300) being equipped to measure acceleration,
said electronic units (300) comprising:
a receiving unit receiving radio signals from the central transmission and reception module,
the reception unit being capable of measuring the power of the radio signals received from the central transmission and reception module (100),
for each electronic unit (300), the method including the following operations:
measuring the power of the radio signals issued by the central transmission and reception module (100) and received by the electronic unit,
distributing the received radio signals into the two following signal groups:
a first group corresponding to the signals received chronologically between the high point and the low point,
a second group corresponding to the signals received chronologically between the low point and the high point,
such that if a majority of received signals is measured at high power between the high point and the low point, the wheel (200) containing the electronic unit (300) completing this measurement is arranged at the rear of the central transmission and reception module (100), if a majority of signals received is measured at low power between the high point and the low point, the wheel (200') containing the unit completing this measurement is arranged at the front of the central transmission and reception module (100);

the method thus determining the front and rear of a tire by measuring the acceleration, the central transmission and reception module (100) being mounted such that when the central transmission and reception module (100) is fixed at the level of an axis of the axle a situation occurs where no majority appears in the signals measured, thus confirming that the wheel (200) containing the electronic unit (300) completing this measurement is placed at the height of the central transmission and reception module (100).

2. Method according to claim 1, CHARACTERIZED IN THAT it comprises causing the transmitter to transmit from the electronic unit (300) when the latter is located properly oriented in relation to the central transmission and reception module (100).

3. Method according to claim 1, CHARACTERIZED IN THAT it comprises causing the central transmission and reception module (100) to transmit to the electronic unit (300) reception device when the latter is well oriented in relation to the central transmission and reception module (100).

4. Method according to claim 1, CHARACTERIZED IN THAT it comprises avoiding causing the transmission units of the electronic units to simultaneously transmit to the electronic units (300) fixed to twinned wheels when they are located in the same zone.

5. Method according to claim 1, CHARACTERIZED IN THAT it comprises a high or low tilt sensor so as to determine in which angular section the unit is located.

6. Method according to claim 1, CHARACTERIZED IN THAT each electronic unit (300) comprises a visual benchmark (310) on its upper surface in order to comply with an orientation during its installation on the wheel.

7. Self-tracking method for a data acquisition sensor equipping a wheel including a vehicle tire, said vehicle comprising a plurality of wheels (200) and being equipped with a system comprising an electronic unit (300) for a data acquisition sensor, placed in each tire and equipped with a radio frequency transmitter for the purpose of wireless transmission of said data to a central transmission and reception module (100) placed on the axle or on the frame of the vehicle, the central transmission and reception module (100) receiving and decoding the information signals transmitted by the transmitters on each wheel, each electronic unit (300) being equipped to measure acceleration, the method including using radio signals in the low frequency spectrum (LF), that is, the portion of the radio electric frequency spectrum comprised between 30 kHz and 300 kHz, varying the power of the low frequency signals (LF); and determining the front and rear of a tire by measuring the acceleration.

8. Method according to claim 7, CHARACTERIZED IN THAT it comprises causing the transmitter to transmit from the electronic unit (300) when the latter is located properly oriented in relation to the central transmission and reception module (100).

9. Method according to claim 7, CHARACTERIZED IN THAT it comprises causing the central transmission and reception module (100) to transmit to the electronic unit (300) reception device when the latter is well oriented in relation to the central transmission and reception module (100).

10. Method according to claim 7, CHARACTERIZED IN THAT it comprises avoiding causing the transmission units of the electronic units to simultaneously transmit to the electronic units (300) fixed to twinned wheels when they are located in the same zone.

11. Method according to claim 7, CHARACTERIZED IN THAT it comprises a high or low tilt sensor so as to determine in which angular section the unit is located.

12. Method according to claim 7, CHARACTERIZED IN THAT each electronic unit (300) comprises a visual benchmark (310) on its upper surface in order to comply with an orientation during its installation on the wheel.

* * * * *